(12) United States Patent
Rutledge

(10) Patent No.: US 7,002,620 B1
(45) Date of Patent: *Feb. 21, 2006

(54) SINGLE CAMERA VIDEO INSPECTION SYSTEM FOR WATER WELLS AND BORE HOLES

(76) Inventor: Gary L. Rutledge, 3810 Dublin Rd., Parker, TX (US) 75020

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 723 days.

(21) Appl. No.: 09/259,000

(22) Filed: Feb. 26, 1999

Related U.S. Application Data

(60) Provisional application No. 60/089,824, filed on Jun. 19, 1998, provisional application No. 60/076,312, filed on Feb. 27, 1998.

(51) Int. Cl.
*H04N 7/18* (2006.01)
(52) U.S. Cl. ............................. 348/85; 356/28; 175/45
(58) Field of Classification Search ................ 348/85, 348/838, 37, 338, 83, 65, 163; 386/113; 367/69, 35, 71, 115, 113; 324/338; 356/28, 356/27; 175/40, 45; 73/152.54; H04N 7/18
See application file for complete search history.

(56) References Cited

U.S. PATENT DOCUMENTS

| | | | | |
|---|---|---|---|---|
| 4,532,544 A | * | 7/1985 | Federau | 348/37 |
| 4,532,545 A | | 7/1985 | Hanson | 358/100 |
| 4,779,201 A | * | 10/1988 | Iizuka et al. | 348/338 |
| 5,107,342 A | | 4/1992 | Gagnon | 358/335 |
| 5,107,705 A | * | 4/1992 | Wraight et al. | 348/85 |
| 5,134,471 A | | 7/1992 | Gendron et al. | 358/100 |
| RE34,265 E | * | 5/1993 | Foster et al. | 356/28 |
| 5,528,453 A | * | 6/1996 | Berman et al. | 348/838 |
| 5,652,617 A | * | 7/1997 | Barbour | 348/85 |

FOREIGN PATENT DOCUMENTS

| | | |
|---|---|---|
| EP | 765086 | 3/1997 |
| GB | 2210530 | 6/1989 |

OTHER PUBLICATIONS

L. Gay and J. Grout, Society of Petroleum Engineers of AIME, Contribution to reservoir behaviour appraisal by television, 1972.
Cues, ProView (Advertisement).
Port-A-Pac Economy Sewer Inspection System, Quality CCTV Equipment (Brochure).
Claude Laval Corporation—Laval Underground Surveys, http://www.lakos-laval.com/under.htm, pp. 1-2, printed 1997.

* cited by examiner

*Primary Examiner*—Gims Philippe
(74) *Attorney, Agent, or Firm*—John A. Thomas

(57) ABSTRACT

A system (10) for video inspection of a passage such as a bore hole (2) is provided. The system (10) includes a carrying case (1) having a deep housing (12) and a removable cover (14) with a spool (16) of coaxial cable (18) stored inside the carrying case (1). The coaxial cable (18) exits the carrying case (1) at an opening (13). A cable arm (20) attached to the carrying case (1) and supported by an adjustable leg (22) conveys the coaxial cable (18) to the passage. Attached to the end of the coaxial cable (18) is a camera assembly (24). Camera assembly (24) includes a single camera operable to capture an image in a first direction along a long axis and a second direction, ninety degrees offset from the first direction.

9 Claims, 7 Drawing Sheets

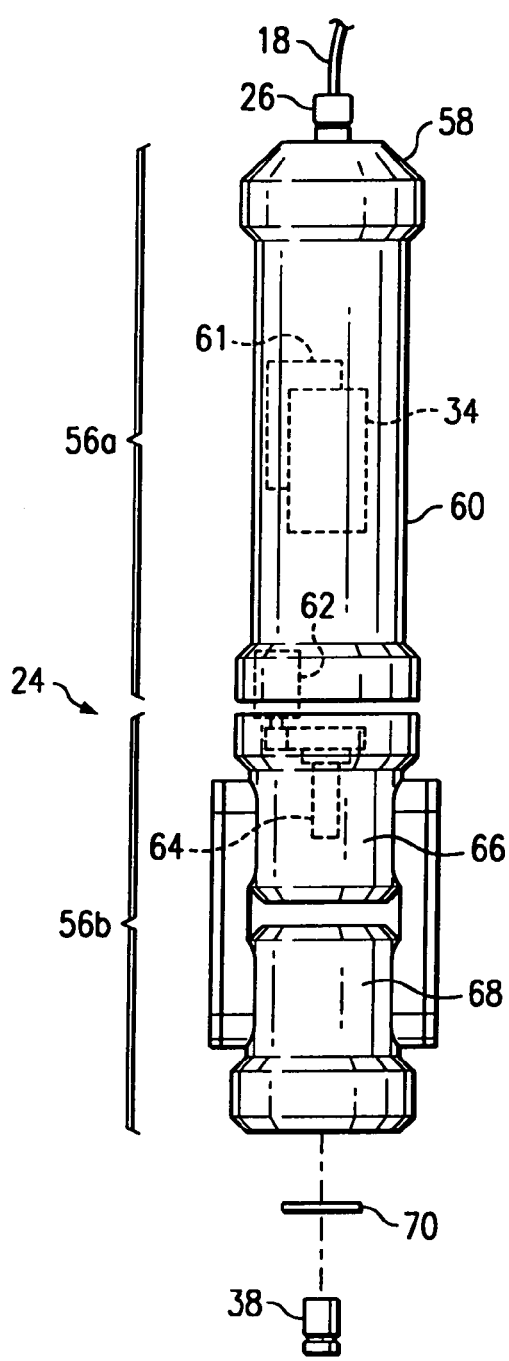
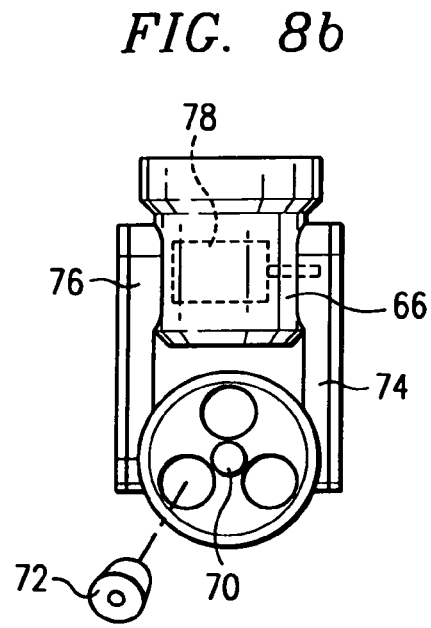
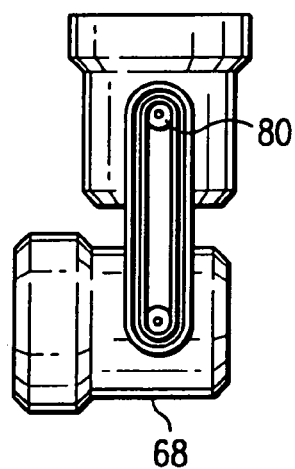
FIG. 8b
FIG. 8c
FIG. 8a

SINGLE CAMERA VIDEO INSPECTION SYSTEM FOR WATER WELLS AND BORE HOLES

RELATED APPLICATIONS

This application claims the benefit of Ser. No. 60/076,312, entitled "VIDEO INSPECTION SYSTEM FOR WATER WELLS AND BORE HOLES", filed provisionally on Feb. 27, 1998 and Ser. No. 60/089,824, entitled "SINGLE CAMERA VIDEO INSPECTION SYSTEM FOR WATER WELLS AND BORE HOLES", filed provisionally on Jun. 19, 1998.

TECHNICAL FIELD OF THE INVENTION

This invention relates generally to inspection tools and more particularly to a video inspection system for passages such as water wells and bore holes.

BACKGROUND OF THE INVENTION

It is often necessary to inspect passages such as water wells, bore holes, pipes, pipelines, tanks or underground cavities. This might be done in order to pinpoint damaged casings, obstruction, or other conditions that can be repaired. A down hole inspection might also be used to located lost or damaged pumps or tools. By capturing the inspection of a borehole or water well on a video tape, a record of the well's condition can be captured and saved.

In a typical down hole surveying system, the down hole tool has a single camera which allows for downward viewing only. This eliminates the possibility of examining the sides of a wall or a bore hole.

One solution to this problem has been to use mirrors in conjunction with a downward camera to capture images of the side of the bore hole. This solution is inadequate because it produces poor image quality, produces an image of reduced size and provides a reversed image.

Another solution proposed to address this problem is a two camera system. One such system is disclosed in U.S. Pat. No. 5,652,617, entitled "Side Scan Down Hole Tool Having Two Cameras" and issued to Barbour on May 31, 1996.

This system includes one camera pointed straight down the bore hole and operable to view down the hole and a second camera mounted to provide a close up of the side of the borehole. One drawback of this system is that an added camera involves added expense, additional complexity and takes-up additional space.

SUMMARY OF THE INVENTION

Accordingly, it may be appreciated that a need has arisen for a single camera video inspection tool for water wells, bore holes or other passages. In accordance with the teaching of the present invention, a single camera video inspection tool is provided that substantially eliminates or reduces the disadvantages of previous inspection tools.

In one embodiment, a system for video inspection of a bore hole is provided. The system includes a carrying case having a deep housing and a removable cover with a spool of coaxial cable stored inside the carrying case. The coaxial cable exits the carrying case at an opening. A cable arm attached to the carrying case and supported by an adjustable leg has the coaxial cable pass over it. Attached to the end of the coaxial cable is a camera assembly. The camera assembly includes a single camera operable to capture an image in a first direction along a long axis and a second direction, ninety degrees off set from the first direction.

In another embodiment, a down hole tool for video inspection is provided. The camera includes a first image sensor operable to acquire an image in a first direction along a first axis and a second image sensor operable to acquire an image in a second direction essentially perpendicular to the first direction. Also included is a camera board and processor coupled to the first image sensor and second image sensor operable to receive an image from either the first image sensor or second image sensor and prepare the image for display.

In another embodiment, a down hole tool for video inspection is provided. The tool includes an image sensor in a housing operable to capture an image in a first direction parallel to a first axis. The image sensor is further able to capture an image in a second direction. The second direction is approximately perpendicular to the first direction. Also included is a camera board and processor coupled to the image sensor and operable to process the image and prepare it for display.

The present invention provides various technical advantages over current methods. For example, a single camera can be used to view downward images and side images, reducing the size and bulk of the camera assembly. Also, an inspection tool is provided that can be easily transported. Other technical advantages may be readily apparent to one skilled in the art from the following figures, descriptions and claims.

BRIEF DESCRIPTION OF THE DRAWINGS

For a more complete understanding of the present invention and advantages thereof, reference is now made to the following descriptions taken in conjunction with the accompanying drawings, in which like numbers represent like parts, in which:

FIGS. 8A, 8B, and 8C illustrate a one camera system in accordance with the teachings of the present invention;

DETAILED DESCRIPTION OF THE INVENTION

Embodiments of the present invention and its advantages are best understood by referring to FIGS. 1 through 10 of the drawings, like numerals being used for like and corresponding parts of the various drawings.

Figure 1:
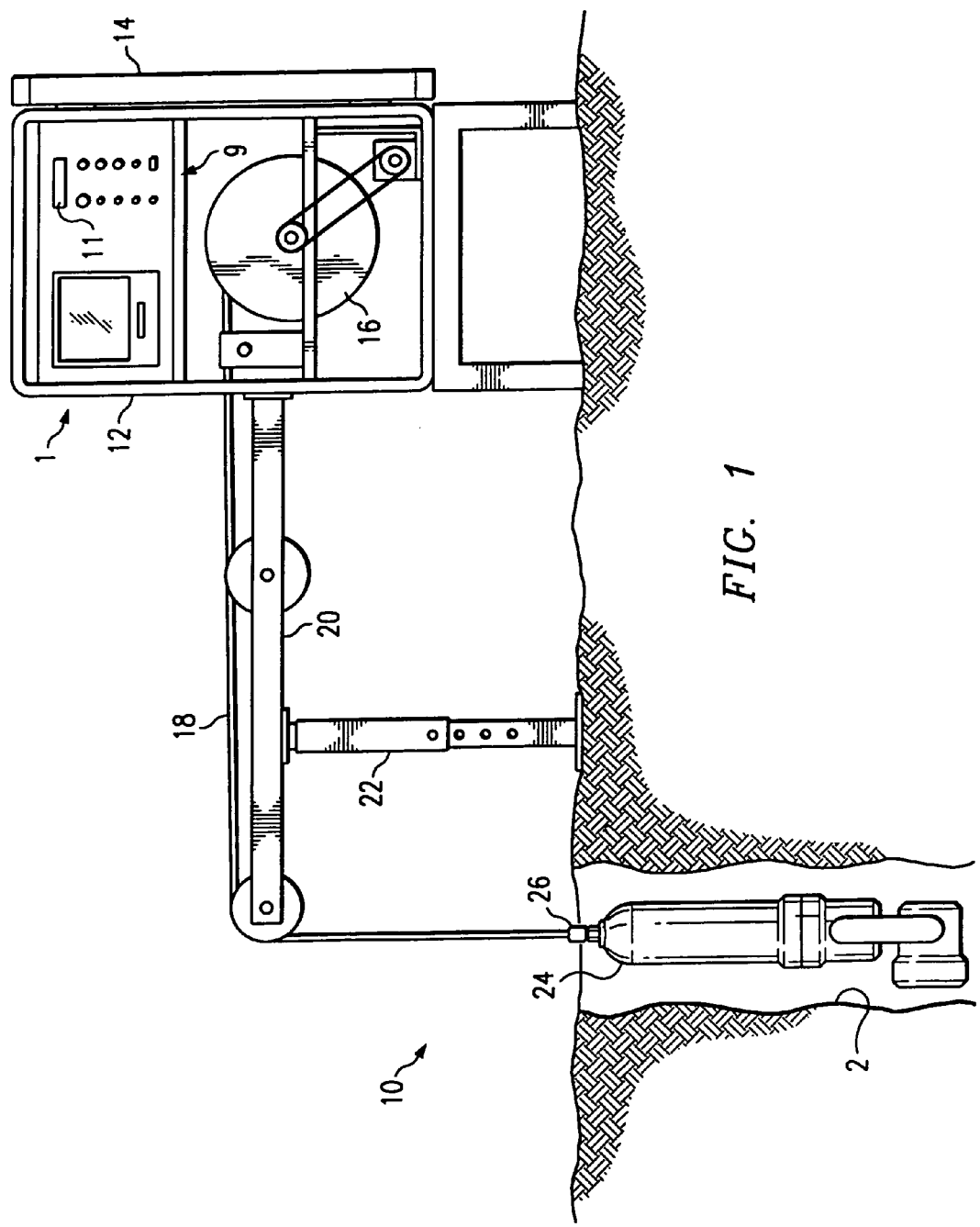
FIG. 1 illustrates a system for inspecting bore holes and water wells.

FIG. 1 illustrates a system for using a video inspection system in accordance with the teachings of the present invention. System 10 includes a carrying case 1 which includes a deep housing 12 and a removable cover 14. Carrying case 1 also includes a spool 16 of coaxial cable 18. Coaxial cable 18 is fed through carrying case 1 and over a cable arm 20 which is supported by an adjustable leg 22. The end of coaxial cable 18 is attached to down hole camera assembly 24, which will be discussed in detail in conjunction with FIGS. 6 through 10. Coaxial cable 18 can be equipped with a quick disconnect 26. One half of the quick disconnect is mounted to coaxial cable 18 and the other half near the top of camera assembly 24. This allows for quick disconnection of camera assembly 24 from coaxial cable 18, so that other cameras or analytical instruments can be attached to coaxial cable 18 and the remainder of the system without disrupting the seal integrity of camera assembly 24. The system is designed for easy transportation and can be run off a generator or battery. Components in carrying case 1 are designed for easy removal and replacement. Camera assembly 24, in one embodiment, is constructed of stainless steel which is water sealed to at least a depth of 2300 feet at an approximate pressure of 1000 pounds per square inch.

In operation, down hole camera assembly 24 is lowered into a well or bore hole 2 that needs inspecting. Bore hole 2 can be a well water hole, a natural gas or oil well, a hole produced at a construction site, a hole produced when taking a core sample or any other hole in the ground that needs to be investigated. Coaxial cable 18 is fed from through housing 12 and over cable arm 20 as camera system 24 is lowered. Depth information and video from camera assembly 24 are displayed on a monitor 5 located in housing 12. Further details on the operation of system 10 are provided in FIGS. 2–10.

The complete system is made up of five subassemblies. The carrying case, which is illustrated in FIG. 2, the control system and monitor, which is illustrated in FIG. 3, the cable winder, illustrated in FIG. 4, the cable arm encoder illustrated in FIG. 5 and variations of the cameras illustrated in FIGS. 6–10.

Figure 2:
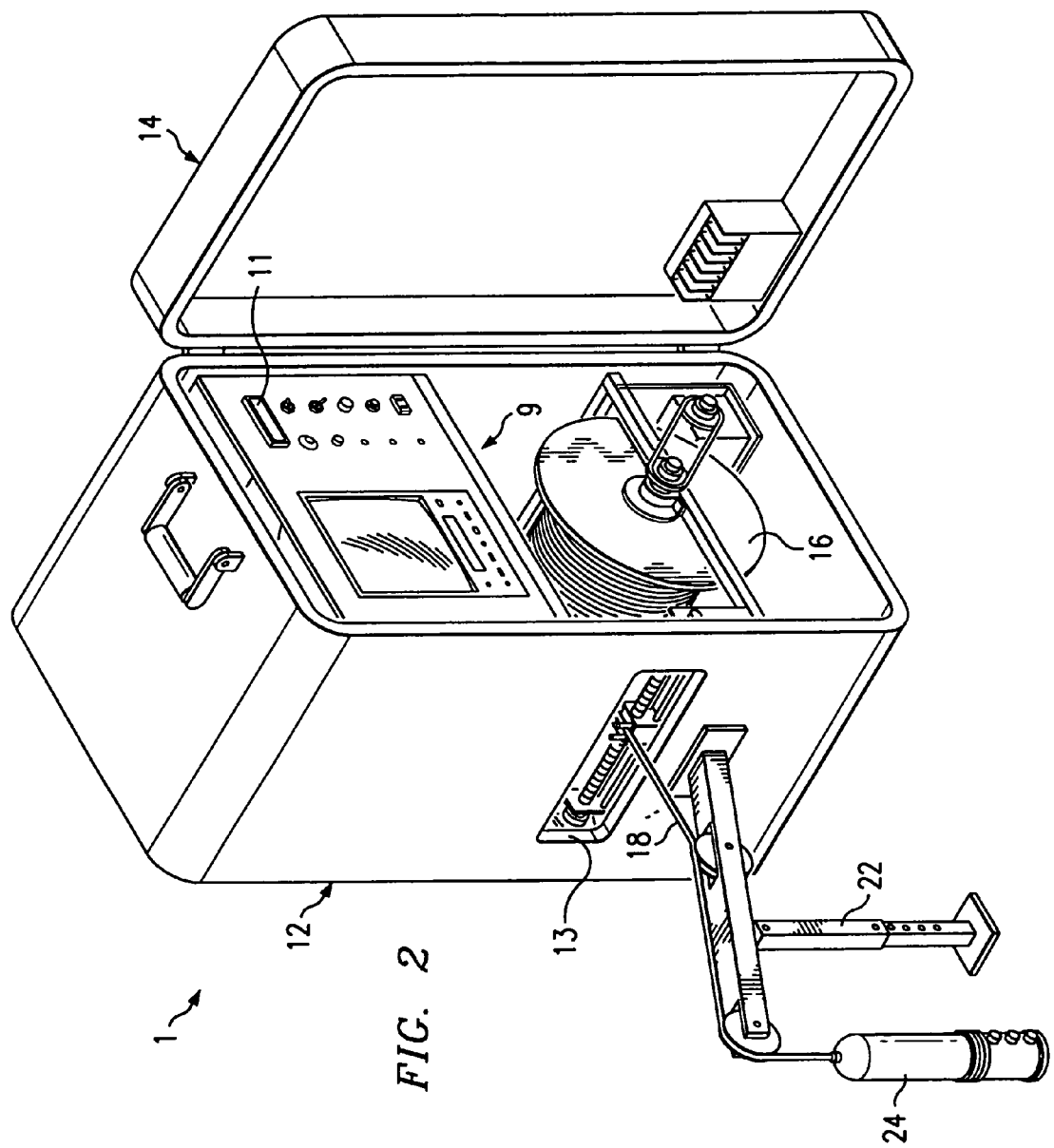
FIG. 2 illustrates a carry case in accordance with the teachings of the present invention.

FIG. 2 illustrates the carrying case 1 in accordance with the teaching of the present invention. Illustrated is a deep housing 12 which contains a spool 16 of coaxial cable 18 as well as electronic equipment that will be discussed in conjunction with FIG. 3. Attached to deep housing 12 is a removable cover 14 which can close to provide a water-tight seal. Also illustrated is opening 13 which allows coaxial cable 18 to pass from spool 16 to outside carrying case 1. Carry case 1 can be mounted to a pickup truck or van. Alternatively, carrying case 1 can be transported to a site by manual labor.

Figure 3:
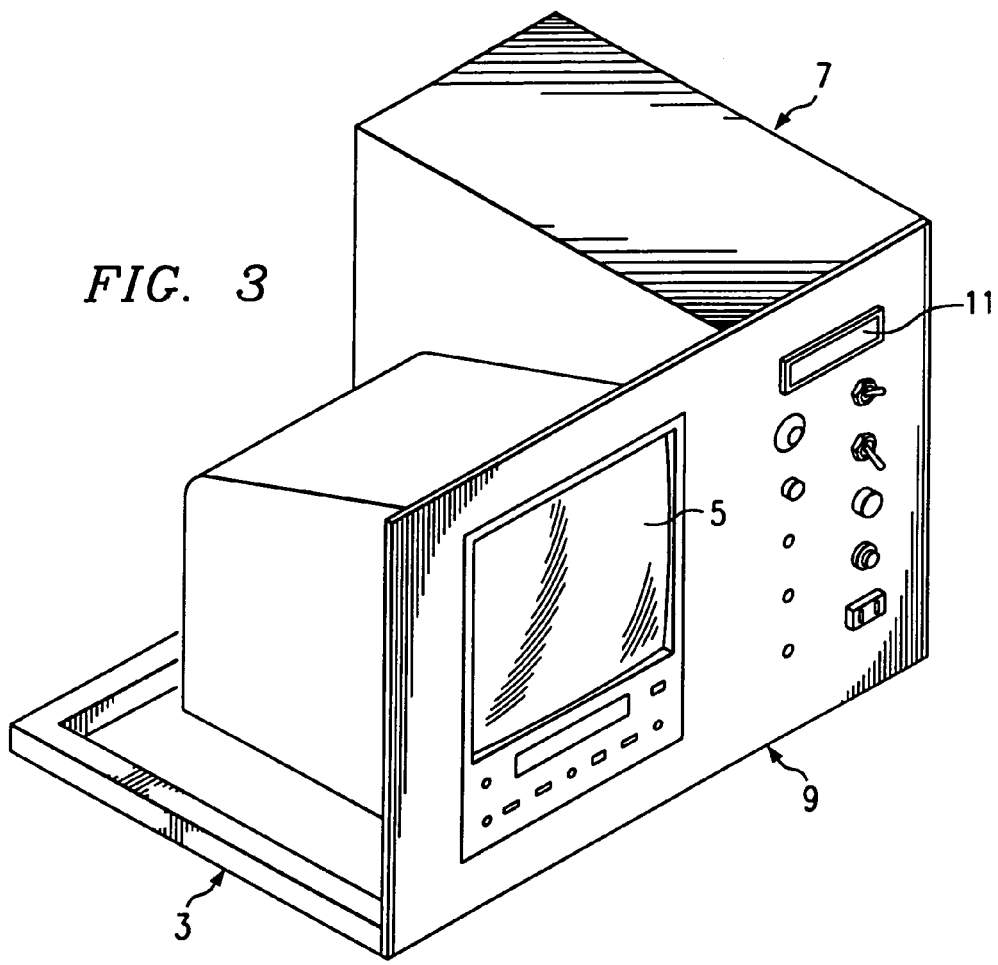
FIG. 3 illustrates a control system and monitor in accordance with the teachings of the present invention.

FIG. 3 illustrates a control system 9 and monitor 5 in accordance with the teaching of the present invention. Control system 9 includes a monitor 5. Also pictured are a depth gauge 11 which can display the depth of camera assembly 24. Also included are electronics 7 which provides for control of the camera, control of the power supply, control of monitor 5 and control of or regulation of any other electronic system. Monitor control electronics, power supply electronics and camera control electronics are well known to those skilled in the art. The entire unit is mounted on a rail 3 for easy removal. Monitor 5 is operable to display the output of camera assembly 24. It also is operable to display the depth of camera assembly 24. Additionally, monitor 5 can include an integrated video tape recorder or can attach to an external video tape recorder or similar storage device for recording what is displayed on monitor 5. Monitor 5 can also be attached to a video printer, not pictured, which can provide pictures of the display.

Figure 4:
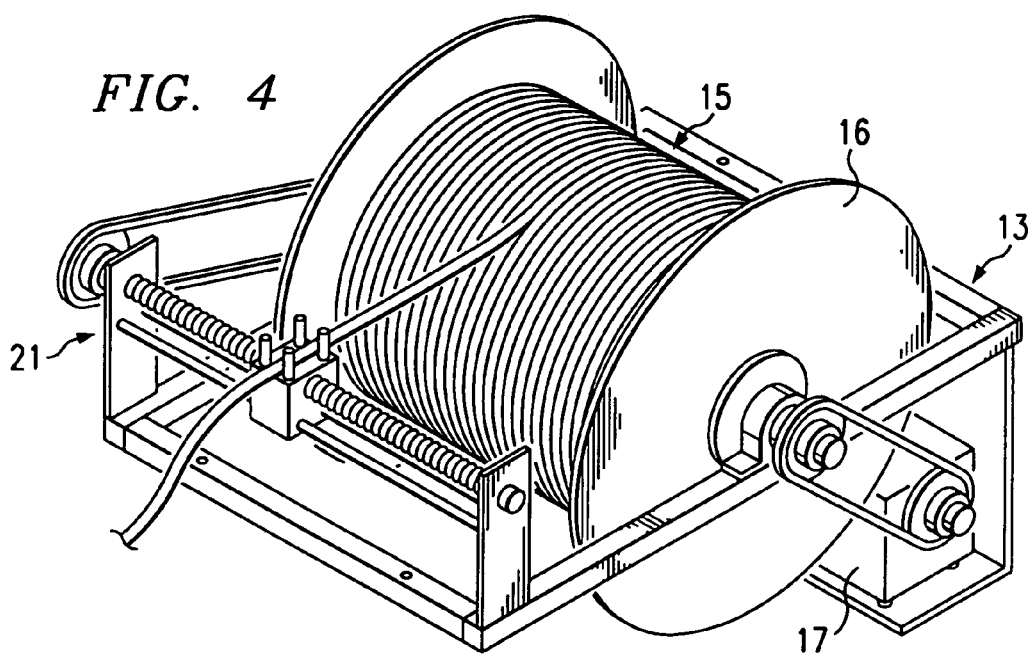
FIG. 4 illustrates a cable winder in accordance with the teachings of the present invention

FIG. 4 illustrates a cable winder in accordance with the teaching of the present invention. Cable winder 13 includes spool 16 of coaxial cable 18. Spool 16 is controlled by a motor 17 which is linked to spool 16 via a chain or belt. As cable is wound or unwound by motor 17 (which is a reversible motor), it passes over level mechanism 19, which maintains an even distribution of coaxial cable 18 over spool 16. Motor 17 controls are mounted on control system 9 and can be lowered and raised by an operator.

Figure 5:
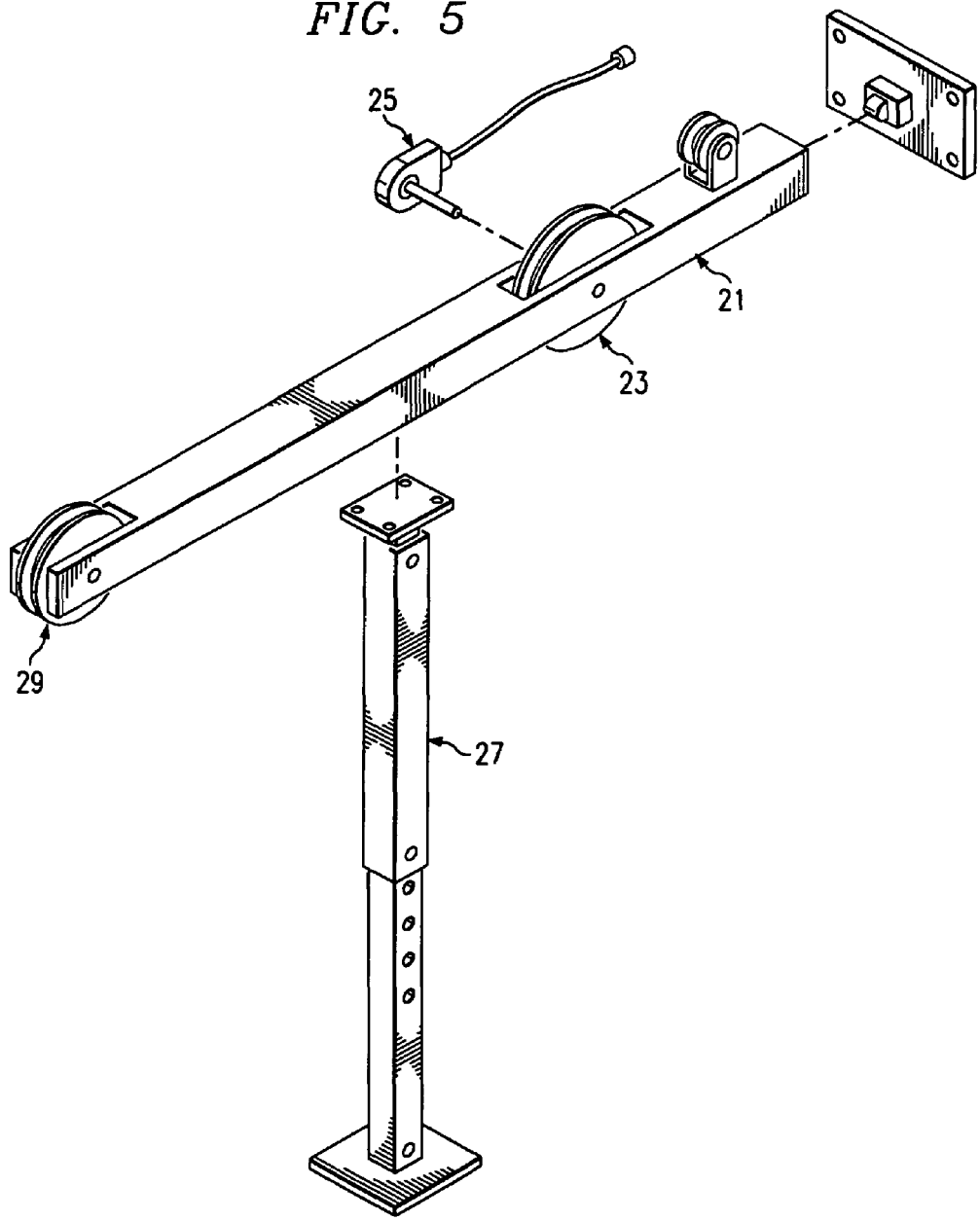
FIG. 5 illustrates a cable arm encoder in accordance with the teachings of the present invention.

FIG. 5 illustrates a cable arm encoder in accordance with the teaching of the present invention. Illustrated is cable arm 20 which can be supported by adjustable leg 22. Also included is an encoder pulley 23 which is attached to electronic encoder shaft 25. As coaxial cable 18 moves along encoder pulley 23, encoder shaft 25 turns. The number of turns can then be used to determine the amount of cable sent in terms of linear feet or linear meters as is well known to those of skill in the art. The result can be displayed directly onto monitor 5. Also included on cable arm 20 is support pulley 29, which is used to support the cable and camera assembly 24 as it is conveyed along the passage. Encoder shaft 25 could be mounted on to support pulley 29.

Figure 6:
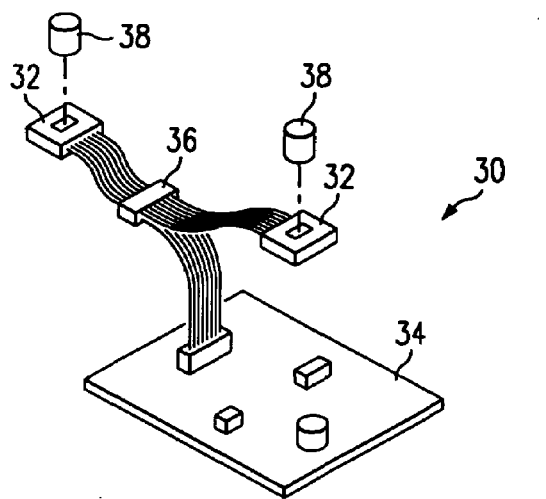
FIG. 6 illustrates a single camera assembly in accordance with the teachings of the present invention.

FIG. 6 illustrate a single camera in accordance with the teachings of the present invention. Single camera 30 includes one or more image sensors 32 coupled to a single camera board and processor 34. A single camera may have multiple image sensors 32 but only one camera board and processor. Image sensors can be charged coupled devices (CCD) sensors, such as the Sony ICX086AK, or can be other types of sensors such as CMOS sensors. In embodiments where single camera 30 includes multiple image sensors 32, a switch is provided to allow switching between image sensors 32. Switch 36 can be any type of electronic switch and can be fiber optic switches as well. Associated with each image sensor 32 are optics 38 which are used to focus the image on image sensor 32. Optics 38 can be of fixed focal length, typically providing a wide angle view, or can be of variable focal length in order to provide a zoom feature. A zoom feature can also be provided electronically, by manipulation of the image captured by image sensor 32.

Figure 7:
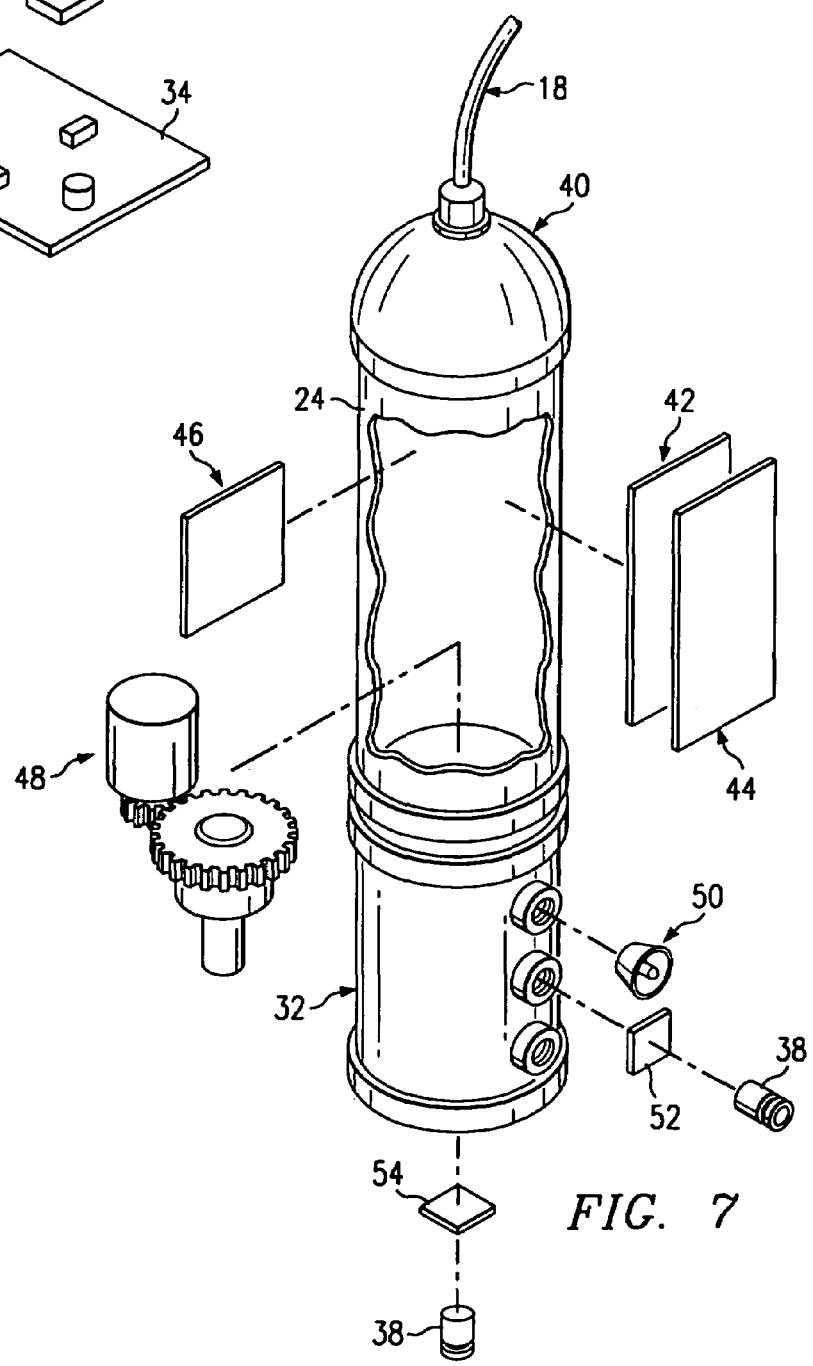
FIG. 7 illustrates a two camera system in accordance with the teachings of the present invention.

FIG. 7 illustrates a double camera embodiment of the present invention. Illustrated in FIG. 7 is a coaxial cable 18 attached to an upper housing of camera assembly 24. Upper housing 40 of camera assembly 24 includes two camera control boards 42 and 44, along with interface control 46. The interface control 46 ties camera assembly 24 to control system 9 as illustrated in FIG. 3, through coaxial cable 18. Control boards 42 and 44 and interface control 46 are well known, readily available, off-the-shelf devices as are well known by those of skill in the art. Lower housing 41 of camera assembly 24 includes a down view camera 54 and a side view camera 52. Side view camera 52 is mounted approximately 90 degrees from down view camera 54. Down view camera 54 is operable to view down a long axis of a bore hole or water well while side view camera 52, views along a plane approximately perpendicular to the long axis of the bore hole. Illumination for the cameras is provided by high intensity lights 50 with two located on the side and three located on the lower face of the housing and associated with down camera 54. The lower housing is mounted in such a way that side view camera 52 can be rotated while downward view camera 54 stays fixed. Side view camera 52 is rotated by means of a stepper motor 48.

Camera assembly 24 is lowered into a well or bore hole by means of coaxial cable 18 stored on a motor driven spool 16 bolted into housing. As coaxial cable 18 is unwound or wound, it threads a level wind mechanism 19 which maintains an even distribution of the cable 18 over the spool 16.

Once camera assembly 24 is lowered into a passage such as a well or bore hole, pipe, tank, pipeline, pit or any other fluid containment system, the video is displayed on the monitor 5 and viewed by the operator at the surface. Typically a user would switch between down view camera 54 and side view camera 52 depending on what view was needed. Side view camera 52 can also be rotated 360 degrees For enhanced viewing. In one embodiment the display of monitor 5 can be split into two or more windows. Part of the display could show the view of down view camera 54 while another part could display the view of side camera 52. One advantage of this arrangement is that when a split screen is used, the down view camera 54 image is fixed while the side view camera 52 can provide a moving image of the condition of the sides of a bore hole or similar structure. An operator can then see down hole problems, make note of the depth or provide a voice-over narration on the tape using a microphone input (not shown) which can be provided as part of the video tape recorder.

FIGS. 8A, 8B, and 8C illustrate a single-camera system with a single image sensor. Camera assembly 24 consists of an upper section 56a and a lower section 56b. Upper section 56a comprises camera control board 34 along with an electronic interface control 61 which ties the camera system to the master control panel as illustrated in FIG. 3, through the coaxial cable 18. The housing 58, 60 of upper section 56a, in one embodiment is constructed of stainless steel which is water sealed to at least a depth of 2300 feet at an approximate pressure of 1000 pounds per square inch.

Lower section 56b of camera assembly 24, is comprised of two parts, an upper part 66 coupled to a lower part 68. Upper part 66 and lower part 68 are coupled by a pair of pivot arms 74 and 76, which are rigidly mounted to upper part 66 and lower part 68 by pivot shafts. This connection allows lower part 68 to be suspended and able to rotate 90 degrees from a vertical to a horizontal position.

Upper part 66 is coupled to upper section 56a by a hollow shaft 64 which may be rotated by a stepper motor 62 located in upper section 56a. Coaxial cable 18 and other cables are routed from upper section 56a to lower section 56b via hollow shaft 64.

FIGS. 8B and 8C illustrate lower section 56b of camera 60. As illustrated in FIG. 8B, lower section 56b contains a high torque dc motor 78 which is connected to a chain and sprocket system 80 as illustrated in FIG. 8C. Chain and sprocket system 80 are mounted within one of the pivot arms 74. Chain and sprocket system 80 are therefore connecting upper part 66 with lower part 68. Second pivot arm 76 provides a path for routing coaxial cable 56 and other electronic cables from hollow shaft 64 through upper part 66 of lower section 51b to lower part 68 of lower section 51b in order to provide power to a video camera 70, a plurality of lights 72, and pivot switches (not pictured) contained in lower part 68.

Lower part 68 comprises the camera enclosure which contains a single image sensor 70 with a wide-angle lens. Image sensor 70 typically includes a CCD-type image sensor. Lower part 68 also includes three high intensity lights 72, which can be adjusted to provide for a variety of brightness levels. When image sensor 70 is pointed down, lights 72 may be set for a variety of voltages to display a variety of brightness levels. Down position is achieved when the image sensor is pointing down the bore hole or passage along an axis parallel to the long axis of the bore hole. This is a first position. The second position is ninety degrees off-set from the first position and is the side-view position. When image sensor 70 is rotated to a side-view position, the voltage supplied to lights 72 are automatically switched to a lower setting in order to reduce the brightness caused by reflection off of the wall of the passage, particularly when camera system 60 is used in white PVC casing. When image sensor 70 is in side-view mode, lower part 68 is operable to rotate a full 360 degrees around the first axis to view the side wall of the bore hole or well casing. The rotation is controlled at the control panel as illustrated in earlier figures and allows for image sensor 70 to be started, stopped and reversed to a complete 360 degrees while in a side-view mode. Image sensor 70 can capture an image at any angle between the down position and the side-view position.

Figure 9:
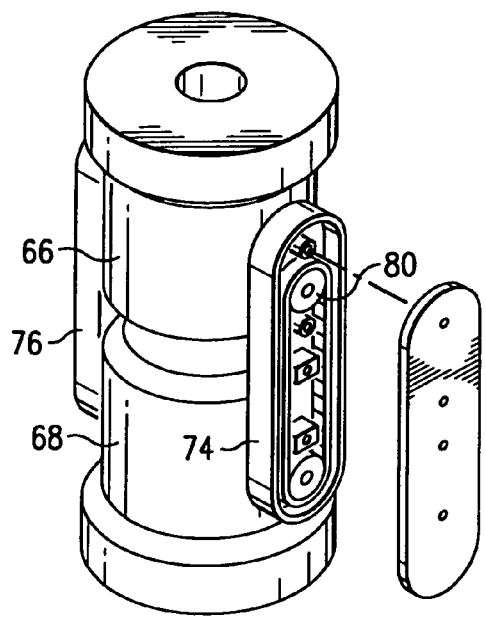
FIG. 9 illustrates a close-up view of the lower section of the one camera system in accordance with the teachings of the present invention; and, FIG. 10 illustrates a single camera system having multiple image sensors in accordance with the teachings of the present invention.

FIG. 9 illustrates a close-up view of lower section 56b of camera system 60. Illustrated in upper section 66 coupled to lower section 68 by pivot arms 74 and 76. Also, illustrated is chain and sprocket system 80 as housed inside pivot arm 74. As mentioned before, chain and sprocket system allows lower section 68 to be moved from a horizontal to a vertical position to allow for both down hole view and side viewing.

In operation camera assembly 24 is lowered into a passage such as a well, pipe, pipeline, bore hole, tank, pit or any other fluid containment system. As previously described in conjunction with FIG. 5, as the cable 18 is lowered, electronic devices 25 measures the linear feed of cable deployed which is recorded in order to indicate depth of camera assembly 24 on the video tape. This allows the depth reading to be shown on a monitor for continuous viewing. The operator of camera assembly 24 can control the positioning of lower section 68 if the operator wishes to only view straight down the bore hole or other opening, lower section 68 can be set to stay in the down position. However, when the operator wants to view a side view of the bore hole or other opening, a signal can be sent from the operator to lower section 56b and lower part 68 can be rotated 90 degrees to a side view position via a pivoting means 80. Pivoting means 80 may include a chain and sprocket assembly, a belt driven assembly, a direct gear assembly or similar means to pivot lower part 68. Then, the entire lower section 56b may be rotated 360 degrees for viewing all of the side of a bore hole or other opening by use of stepper motor 62 and 64. The 360 degree rotation can be started, stopped, or reversed in any order that the operator needs. The advantage of this system is that only one camera is used and there is no need to switch between a down view camera and a side-view camera.

Figure 10:
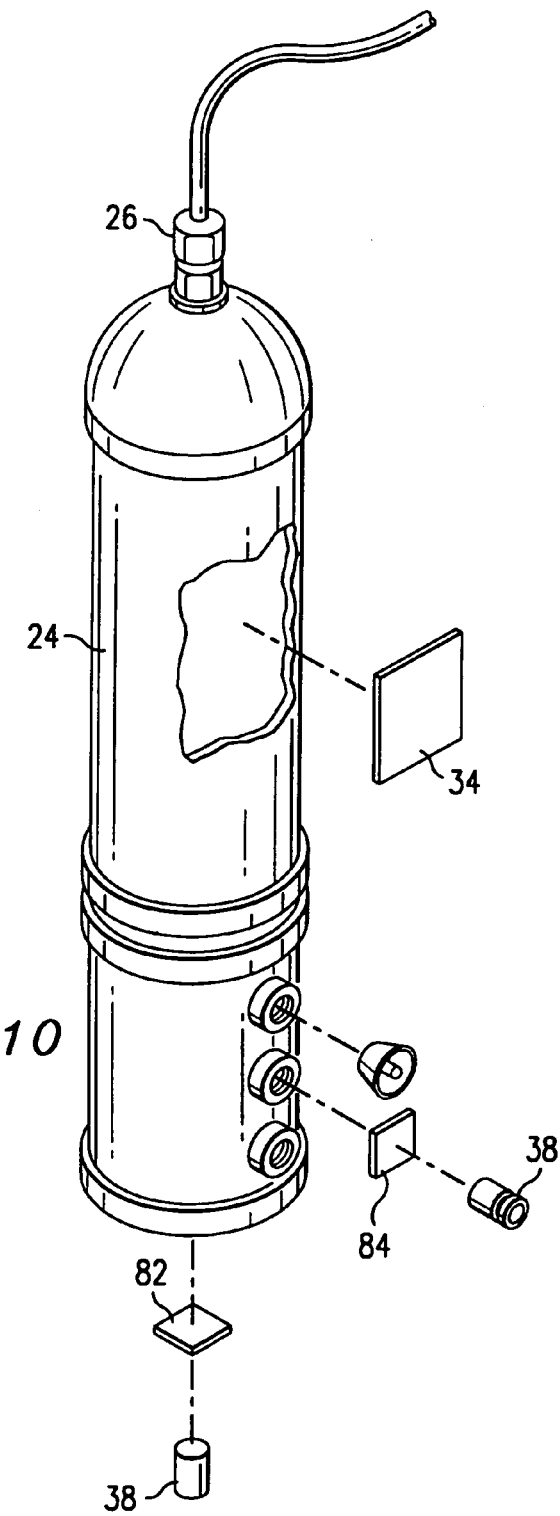

FIG. 10 illustrates a single camera with a multiple image sensor down-hole camera in accordance with the teachings of the present invention. Camera assembly 24 has at least one down image sensor 82 operable to capture a view downward along a first axis and one side image sensor 84 operable to capture an image along a plane essentially ninety degrees from down camera 82. Down image sensor 82 and side image sensor 84 are coupled to a single camera board 34, forming a single camera with multiple image sensors. Side image sensor 84 can be mounted in such a way that it can rotate 360 degrees around camera assembly 24. Alternatively, all or part of camera assembly 24 can be made to rotate in such a way that side image sensors 84 can capture an image in a complete 360 degree circle around the inside of a bore hole or well.

Alternatively, a number of side image sensors 84 can be placed around camera assembly 24 in such a way that the entire side of a bore hole can be viewed by simply switching side view image sensors 84 to view the appropriate sections. Alternatively, camera board and processor 34 can display all of the outputs from side view image sensors 84 together on a display, thus giving an instantaneous three hundred and sixty degree view without rotating camera assembly 24.

While the embodiments discussed in conjunction with FIGS. 1–10 discuss the use of the present invention in bore holes and the like, the present invention can also be used in pipelines and the like that have substantial horizontal runs. In this case, down view would be along a long axis of the pipeline.

Although the present invention has been described in detail, it should be understood that various changes, substitutions and alterations can be made thereto without departing from the spirit and scope of the invention as defined by the appended claims.

What is claimed is:

1. A video inspection system comprising:
   a housing rotatable from a first direction along the long axis of an object being inspected to a second direction approximately perpendicular to the first direction;
   an image sensor coupled to the housing, the image sensor operable to capture an image in the first direction, the image sensor further operable to capture an image in the second direction due to a rotation of the housing; and
   a camera board and processor coupled to the image sensor and operable to process each image and prepare it for display.

2. The video inspection system of claim 1, wherein the housing is operable to rotate around the first axis, the image sensor operable to capture an image when in a first position, a second position and any position in between thereby providing hemispherical coverage at a given location of the object being inspected.

3. The video inspection system of claim 1, wherein the image sensor is mounted in a water tight, pressure sealed camera assembly for use in a bore hole or water well.

4. The video inspection system of claim 1, wherein the image sensor is mounted in a sealed camera assembly for use in a pipeline.

5. The video inspection system of claim 1, wherein the image sensor is mounted in a sealed camera assembly and the camera assembly is attached to a monitor via coaxial cable, the monitor operable to receive the output of the camera board and processor.

6. The video inspection system of claim 5, wherein the coaxial cable includes a quick disconnect to allow easy removal and installation of other camera assemblies or tools.

7. The video inspection system of claim 5, wherein the coaxial cable is stored on a spool in a transportable case.

8. The video inspection system of claim 5, wherein the coaxial cable passes over a cable arm encoder operable to determine the distance that the camera has traveled and display it on the monitor with the output of the camera board and processor.

9. A video inspection system comprising:
   a camera assembly including:
      an upper section having a camera card;
      a stepper motor coupled to the end of the upper section; and
      a lower section coupled to the upper section and the stepper motor, the lower section operable to rotate about an axis when the stepper motor is operational, the lower section further comprising:
         an upper part having a high torque dc motor; and
      a lower part coupled to the upper part by a pivoting means, the pivoting means driven by the high torque motor and operable to pivot the lower part from a down view to a side view, the lower part further comprising an image sensor coupled to the camera card and operable to acquire an image in a down position and a side position and any position in between, the image sensor further operable to acquire an image as the lower section rotates about an axis.

* * * * *